Nov. 10, 1953  H. MOHN  2,658,984
OPTICAL RADIATOR
Filed June 5, 1951
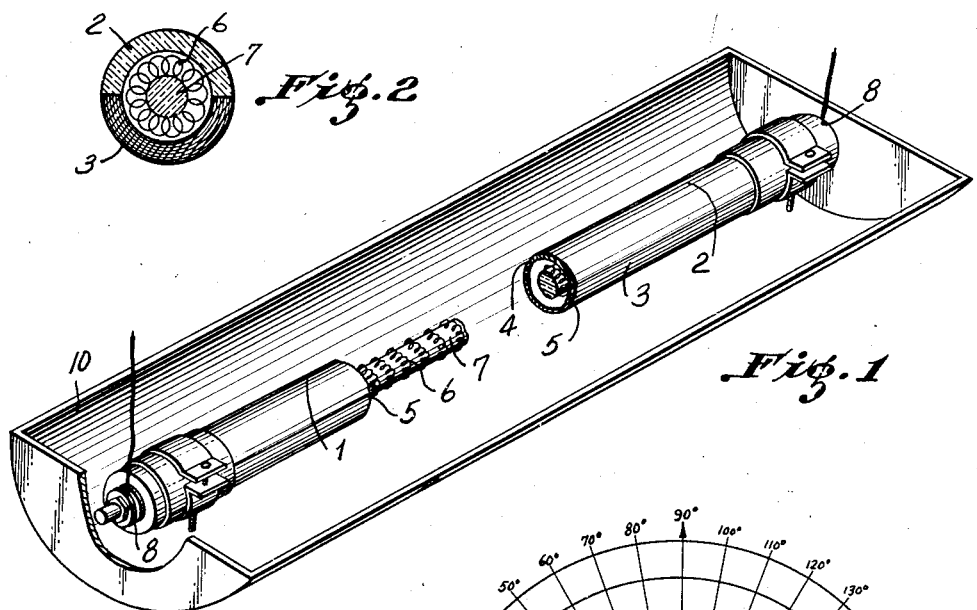
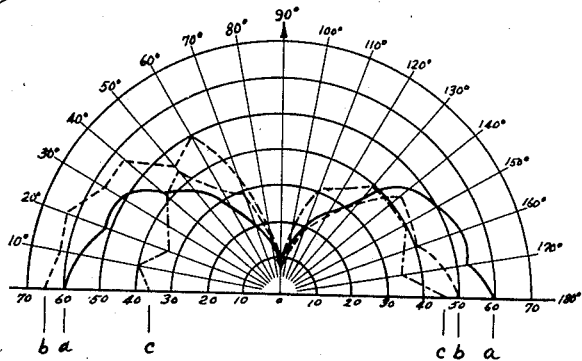
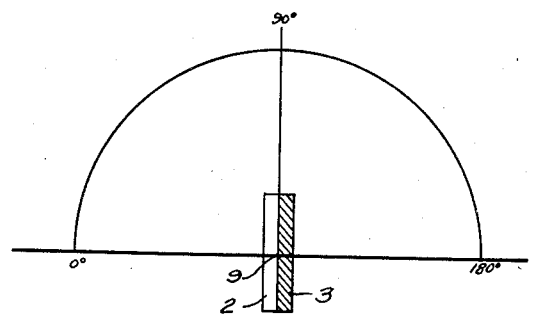
INVENTOR
HEINRICH MOHN
BY Klein & Hart
ATTORNEYS Patented Nov. 10, 1953

2,658,984

UNITED STATES PATENT OFFICE 2,658,984

OPTICAL RADIATOR

Heinrich Mohn, Hailer, Kreis Gelnhausen, Germany, assignor to Heraeus Quarzschmelze G. m. b. H., Hanau (Main), Germany, a corporation of Germany Application June 5, 1951, Serial No. 229,930

Claims priority, application Germany June 23, 1950

12 Claims. (Cl. 219—34)

This invention relates to improvements in optical radiators and more particularly to heat radiators and also to radiating devices capable of emitting rays of the visible as well as the ultraviolet spectral region.

It is one object of this invention to provide and improved radiator exhibiting high radiation intensity within those spectral regions which are encountered in the use of such radiators.

Another object is to provide a casing or sheath in an optical radiator, said sheath surrounding the means for emitting radiation and being adapted to permit any desired spectral distribution.

A further object of this invention is to provide a new and efficient heat radiator provided with means capable of emitting heat radiation and an improved sheath for increasing the overall efficiency of the heat radiator.

A still further object of this invention is to provide a highly effective gas discharge tube capable of emitting intensive ultra-violet radiation.

Other objects and advantages of this invention will become apparent from the following more detailed description.

Heretofore, use has been made, for heating and drying purposes, of heating coils embedded in ceramic material or installed in metal tubes or sheaths wherein they are well insulated. Such devices, however, have the disadvantage that they cannot be used above a certain temperature because their useful life depends upon the resistance to oxidation of the material of the metallic casing or ceramic support. More recently, heat radiators of especially high capacity were produced, these being provided with a silicon dioxide casing, which does not suffer from such disadvantages; such elements may be heated to temperatures above 1000° C. without fear of destruction, i. e. to temperatures at which the silicon dioxide sheath is excited to self-emission of rays.

In such prior heat radiators, opaque fused silica is used as material for the casing; however, such opaque fused silica has a rather low transmittance for rays given off by the heating coil in the short-wave, infra-red region, for instance between 1 $\mu$ and 4 $\mu$, although radiation of such a quartz casing is considerable at higher working temperatures in the spectral region between 1 $\mu$ and 12 $\mu$.

According to this invention, there is provided a radiating element in which use is made not only of the radiation emitted by the heating coil, but also of the self-emission of the silicon dioxide forming the sheath or casing of the heating coil. In order to accomplish this, use is made of a sheath of which preferably one of its semi-cylindrical components consists of or comprises clear transparent fused quartz, and the other longitudinal component consists of opaque fused silica, the lines dividing said different materials running in a longitudinal direction throughout the sheath or tube. It has been found that the quartz material known as opaque fused silica which has been produced heretofore by a centrifugal casting process is particularly suitable for this purpose. The cylindrical sheath of different materials, namely one of clear transparent vitreous and the other of opaque fused silica, may be manufactured in a simple manner, for instance, by a combined application of a known drawing process and by welding together the two elements to form one single sheath or tube.

The term "clear, transparent vitreous quartz" as used herein and in the claims annexed hereto designates any material composed of pure silicon dioxide which is clear and transparent like ordinary window glass while the term "opaque fused silica" designates any non-transparent fused silicon dioxide usually of lesser purity, which has a milky appearance like unglazed porcelain.

The heating coil in the sheath is so dimensioned that the required temperatures and radiation intensities are assured, in general, so that at least 1 watt, preferably 3 to 4 watts, are emitted from 1 square centimeter of the surface of the sheath. The heating coil consists, as is customary, for instance, of metals or alloys having a high melting point or of silicon carbide.

The accompanying drawings illustrate preferred forms of a heat radiating device according to this invention; they should be construed as examples only, and not as indicative of structural limitations. In these drawings:

Fig. 1 is a perspective overall view of a heat radiator of which parts are broken away;

Fig. 2 is a cross-sectional view through the heating element proper;

Fig. 3 is a diagram showing the radiation patterns of 3 radiators plotted against polar coordinates;

Fig. 4 is a diagram showing the two halves of the radiator casing in relation to a plane placed through the longitudinal axis of the radiator vertically upon said two halves;

Fig. 5 is a cross-sectional view through a modified heating element.

As shown in Fig. 1 of the drawings, the sheath 1 consists of two elongated members of different material, namely the one half 2 of clear, transparent vitreous quartz and the other half 3 of opaque fused silica. The lines 4 and 5 dividing said two halves preferably form sharp lines as shown. The heating coil 6 inside the encasing tube is arranged on a supporting rod 7 of quartz glass. The sheath is arranged as closely as possible around said heating wire. Current is supplied to the heating spiral wire at the terminals 8.

Fig. 2 shows a cross-section through the heating element, of which the part 2 consists of transparent quartz and the other part 3 of opaque silica, the remaining elements being of conventional construction.

The radiation emitted by the heating coil passes practically unimpaired through the clear quartz glass half 2 while, due to the high temperature, the opaque opposite half 3 radiates very strongly and emits a portion of its energy also through the clear half of the tube. In this manner, the high permeability of the clear quartz glass for rays in the spectral region between 1 $\mu$ and 4 $\mu$ is fully utilized, and at the same time the self-emissivity or heat radiation of the highly heated other half of the tube and its reflecting effect are also taken advantage of. The reflectivity may be increased by giving said half an approximately parabolic shape.

In the above embodiment of the invention, the maximum of the radiated energy lies at wave length region of somewhat above 2 $\mu$, depending upon the temperature of the heating coil. Since quartz glass, in the thickness employed in the device, possesses good permeability to transparent infra-red radiation, the radiation of the heating element, up to about 4 $\mu$, is specifically that of the conductor 6. Rays of a wave-length of above 4 $\mu$ are completely absorbed by quartz. Therefore, in this region the radiation is specifically that of the sheath alone. It follows that, in the new radiator, in practical operation, the spectral distribution of the heating coil is very advantageous and effective. But this does not mean that, without the sheath, the radiator would exhibit the same properties. On the contrary, as shown in Fig. 3, the sheath is of substantial importance in various respects. The superiority of the new radiator over the known devices derives from this fact.

In Fig. 3, the radiation distribution patterns of 3 radiators of 200 mm. length possessing identical heating coils are plotted against polar coordinates. The radiation distribution patterns were determined by means of pyrometers. The curves represent the total amount of radiation emitted in any given direction and measured relatively to each other. The best information about the radiation properties of said quartz glass may be obtained from the radiation pattern along a plane through the longitudinal axis of the radiator. As indicated diagrammatically in Fig. 4, said plane in a so-called "composite-tube radiator" according to this invention, is selected in such a manner that it stands vertically upon the two tube halves 2 and 3. The measurements were carried out at a distance of 800 mm. from the centre 9 of the radiator.

In Fig. 3, curve $a$ corresponds to a radiator with a casing of opaque silica-glass, $b$ to the "composite-tube radiator" according to this invention, and $c$ to an experimental radiator wherein the heating coil is not surrounded by a tube. The plotted values combined by the curves are not represented in an absolute standard measure but in a relative measure of energy (numbers from 10 to 70). Considerable differences are shown to exist between said curves although in any given case the same amount of heat energy was used. In the case of a radiator having no sheath, the intensity in almost all directions is much less because a large portion of the energy is lost by convection. Therefore, the tubular heating element reaches a higher temperature and its efficiency is considerably increased. At the same time, the maximum of spectral distribution is automatically displaced towards the short-wave region. Thus, the directive effect of the quartz tube is readily recognizable from the diagram as a further favorable influence. While the heating conductor per se (curve $c$ of Fig. 3) emits a considerable portion of its radiation in direction of the radiator axis, a fact which is not at all desired, the tube of opaque silica (curve $a$ of Fig. 3) bundles the radiation to a considerable extent towards the range vertical to the axis. The "composite-tube radiator" (curve $b$ of Fig. 3) produces a strong additional directing effect towards the transparent quartz glass side because the backwall of opaque fused silica acts as diffuse reflector on account of its re-dispersing effect. Furthermore, self-radiation corresponding to the temperature of the backwall is added thereto.

For practical purposes the radiator of this invention is preferably provided with a metallic parabolic reflector such as the one shown at 10 in Fig. 1 for example. In this manner, a satisfactory concentration and orientation of the emitted energy toward the material to be heated or dried is achieved. The reflector may be made of aluminum or a similar material.

It has been found that the total heat emission of the device of this invention increases considerably in the entire spectral region between 1 $\mu$ and 16 $\mu$ if self-radiation of the quartz glass, especially that of the backwall of opaque fused silicia, is caused to approximate the radiation of a black body. This may be achieved by blackening the opaque fused silica by the addition of metal oxides to the molten mass when making the same. For this purpose there may be added oxides of iron, chromium, manganese and similar oxides in the amount of fractions of one per cent. This coating with a layer containing metal oxides may be obtained in a very simple manner when producing the tube of opaque fused silica by means of a centrifugal casting process. This process is carried out by fusing silicon dioxide granules, for instance, granules of pure sand, in a rotating cylinder by an electric arc moving in the longitudinal axis of said cylinder, whereby the molten silicon dioxide assumes the shape of a cylinder of opaque fused silica. By adding metal oxides, for instance, iron oxides, at the appropriate moment to the molten material, a thin layer containing said metal oxides may be produced. Hence, it is not at all necessary that in the "composite-tube radiator" according to this invention the opaque fused silica is composed in its entire thickness of the blackened material. It is sufficient that the opaque half sheath comprises only an inside layer of blackened opaque fused silica, while the thicker outside layer remains white. An example of the last described structure of the encasing tube is illustrated in Fig. 5. In this figure, 2 represents the half tube of transparent quartz glass and 3 the semi-cylinder of opaque fused silica. As shown at 11, the latter contains silica blackened by the addition of metal oxides finely distributed therein. This method of blackening may be carried out without difficulty especially when producing the tubes by the centrifugal casting process by conducting the carbon arc which effects the melting of the silicon dioxide for a sufficiently long period of time along the inner surface of the tube. On the other hand, it is of advantage to make the outer side of the opaque fused silica half tube as porous as possible. This may be achieved, when producing the tubes by the centrifugal casting process, by adding gas-generating substances to the molten mass.

The present invention also contemplates filling the space within the tubular heating element with an inert gas, whereby, first, the temperature of the heating coil may be increased considerably resulting in a further increase of the radiation intensity, and, second, it becomes possible to advantageously use a rod of graphite as the heat conductor.

The heat radiator of the present invention may be employed to great advantage for therapeutical purposes, especially for lamps to produce hyperemia and to relieve pain. Of technical applications there may be mentioned, for instance, its use for drying lacquers, paints and coatings, for polymerizing and condensing synthetic resins, and as source of heat to initiate reactions in corrosive materials. Finally, there may be mentioned as a field of application the concentration by evaporation and the drying of all kinds of materials, for instance, of chemically strongly active solvents and of foodstuffs.

Particularly advantageous is the elongated shape of the heating element of this invention, because this shape enables its use for subjecting smaller or larger widths of materials spread out upon conveyer belts in continuous drying apparatus to the effects of its radiation. Of course, it is possible to give these radiators any other desired configuration such as a circular shape, for instance. By arranging side by side a number of said radiators it is possible to form a drying tunnel the walls of which emit heat rays uniformly and in all directions towards the inside.

While the invention, for the sake of clearness and brevity, has been described above as applied particularly to a heat radiator, it is evident from the above disclosure that the same principles may be used with great advantage in many devices capable of emitting optical radiation, such as rays of the visible and of the ultraviolet spectral regions. In these cases means known per se for emitting radiation of the corresponding spectral regions are provided in the casing. Also, instead of electric heating coils, use may be made of gas discharge devices. The advance in the art accomplished by this invention, consists, just as with heat radiators, in using a particular sheath which, in accordance with the cross-sectional view of Fig. 2, is partly composed, in general, half of it, of clear fused quartz glass and partly of opaque fused silica.

I claim:

1. A radiator comprising means for emitting radiation, a sheath surrounding said means, said sheath being composed partly of clear, transparent vitreous quartz glass and partly of opaque fused silica, the lines dividing said quartz glass and silica materials extending substantially in longitudinal direction throughout said sheath, said quartz glass and said silica being welded together to form one single unitary sheath.

2. A radiator comprising electrical resistance means for emitting radiation, a casing surrounding said means, one portion of said casing being composed of clear, transparent fused quartz glass and the other portion thereof being composed of opaque fused silica, the lines dividing said quartz and silica materials extending substantially in longitudinal direction throughout said casing, said quartz glass and said silica being welded together to form one single unitary sheath.

3. A radiator comprising an electric heating coil dimensioned so as to produce desired temperatures and intensities of radiation, and a sheath encasing said heating coil and being filled with an inert gas, a portion of said sheath being composed of clear, transparent vitreous quartz glass and the other portions thereof being composed of opaque fused silica, the lines dividing said quartz and silica materials extending in substantially longitudinal direction throughout said sheath, said quartz glass and said silica being welded together to form one single unitary sheath.

4. A radiator comprising a heating element of graphite, said heating element being dimensioned so as to produce the required temperatures and intensities of radiation, and a sheath surrounding said heating element, said sheath being filled with an inert gas, substantially one half of said sheath being composed of clear, transparent vitreous quartz glass and substantially the other half of said sheath being composed of opaque fused silica, and the lines dividing said quartz and silica materials extending in a substantially longitudinal direction throughout said casing, said quartz glass and said silica being welded together to form one single unitary sheath.

5. A radiator comprising a quartz glass support, a heating wire coiled around said quartz glass support and being dimensioned so as to produce desired temperatures and intensities of radiation, and a sheath surrounding said heating wire and quartz glass support, one half of said sheath being composed of clear, transparent vitreous quartz glass and the other half thereof being of opaque fused silica, the lines dividing said quartz and silica materials extending in substantially longitudinal direction throughout said sheath, said quartz glass and said silica being welded together to form one single unitary sheath.

6. A radiator comprising means for emitting radiation, a sheath surrounding said means, said sheath being composed partly of clear, transparent vitreous quartz glass and partly of opaque fused silica, the lines dividing said quartz and silica materials extending in longitudinal direction throughout said sheath, said opaque fused silica being blackened by the addition thereto of a blackening substance, said quartz glass and said silica being welded together to form one single unitary sheath.

7. A radiator comprising means for emitting radiation, a sheath surrounding said means, said sheath being composed partly of clear, transparent vitreous quartz glass and partly of opaque fused silica, the lines dividing said quartz and silica materials extending in substantially longitudinal direction throughout said sheath, said opaque fused silica being blackened by the addition of at least one metal oxide, said quartz glass and said silica being welded together to form one single unitary sheath.

8. A radiator comprising means for emitting radiation, and a sheath surrounding said means, said sheath being composed partly of clear, transparent vitreous quartz glass and partly of opaque fused silica, the lines dividing said quartz and silica materials extending substantially in longitudinal direction throughout said casing, said opaque fused silica being provided with an inner layer of the same material, said inner layer being blackened by the addition of blackening substances, said quartz glass and said silica being welded together to form one single unitary sheath.

9. A radiator comprising means for emitting radiation, and a casing encasing said means, said casing being composed partly of clear, transparent vitreous quartz glass and partly of opaque fused silica, said opaque fused silica being porous near its outer surface, the lines dividing said quartz and silica materials extending substantially in longitudinal direction throughout said casing, said quartz glass and said silica being welded together to form one single unitary sheath.

10. A radiator comprising means for emitting radiation, a sheath surrounding said means, substantially one longitudinal half of said sheath being composed of clear, transparent fused quartz glass and the other longitudinal half being composed of opaque fused silica, and a parabolic reflector arranged in such a manner that its focal line extends in the direction of the sheath, said quartz glass and said silica being welded together to form one single unitary sheath.

11. A radiating system comprising a gas discharge tube, a sheath surrounding said gas discharge tube, said sheath being composed partly of clear, transparent fused quartz glass and partly of opaque fused silica, the lines dividing said quartz and silica materials extending substantially in longitudinal direction throughout said sheath, said quartz glass and said silica being welded together to form one single unitary sheath.

12. A radiator comprising an electric heating coil dimensioned so as to produce desired temperatures and intensities of radiation, and a sheath encasing said heating coil, said sheath being composed partly of clear, transparent vitreous quartz glass and partly of opaque fused silica, the lines dividing said quartz and silica materials extending in longitudinal direction throughout said sheath, said opaque fused silica being blackened by the addition thereto of a blackening substance, said quartz glass and said silica being welded together to form one single unitary sheath.

HEINRICH MOHN.

References Cited in the file of this patent

UNITED STATES PATENTS

| Number | Name | Date |
| --- | --- | --- |
| 606,792 | Quidas | July 5, 1898 |
| 1,032,267 | Bastian | July 9, 1912 |
| 1,881,241 | Potensa | Oct. 4, 1932 |
| 2,030,820 | James | Feb. 11, 1936 |
| 2,375,369 | Knight et al. | May 8, 1945 |
| 2,407,379 | Morehouse | Sept. 10, 1946 |
| 2,596,837 | Calvert | May 13, 1952 |